Jan. 11, 1966 J. A. RAJCHMAN 3,229,266

MEMORY SYSTEMS

Filed July 11, 1962 9 Sheets-Sheet 1

INVENTOR.
JAN A. RAJCHMAN
BY Samuel Cohen
ATTORNEY

INVENTOR.
JAN A. RAJCHMAN
BY Samuel Cole
ATTORNEY

INVENTOR.
JAN A. RAJCHMAN
BY [signature]
ATTORNEY

Jan. 11, 1966 J. A. RAJCHMAN 3,229,266

MEMORY SYSTEMS

Filed July 11, 1962 9 Sheets-Sheet 4

INVENTOR.
JAN A. RAJCHMAN
BY
Samuel Cohen
ATTORNEY

MEMORY SYSTEMS

Filed July 11, 1962 9 Sheets-Sheet 5

INVENTOR.
JAN A. RAJCHMAN
BY
Samuel Cohen
ATTORNEY

Jan. 11, 1966 J. A. RAJCHMAN 3,229,266

MEMORY SYSTEMS

Filed July 11, 1962 9 Sheets-Sheet 6

INVENTOR.
JAN A. RAJCHMAN
BY Samuel Cohen
Attorney

Jan. 11, 1966 J. A. RAJCHMAN 3,229,266

MEMORY SYSTEMS

Filed July 11, 1962 9 Sheets-Sheet 7

INVENTOR.
JAN A. RAJCHMAN
BY Samuel Cohen
ATTORNEY

INVENTOR.
JAN A. RAJCHMAN
BY Samuel Cohen
ATTORNEY

INVENTOR.
JAN A. RAJCHMAN
BY Samuel Cohen
ATTORNEY

United States Patent Office 3,229,266
Patented Jan. 11, 1966

3,229,266
MEMORY SYSTEMS

Jan A. Rajchman, Princeton, N.J., assignor to Radio Corporation of America, a corporation of Delaware Filed July 11, 1962, Ser. No. 209,013
11 Claims. (Cl. 340—174)

The present invention relates to memories. More particularly, the invention relates to new and improved memory organizations and new and improved memory structures.

The memory system of the invention employs magnetic elements formed of a material such as ferrite and has diodes associated with each element. Selection of a memory location is accomplished by selection of particular row and column conductors which are connected to one another through a magnetic element rather than by coincident currents. The difference between the current passing through a selected memory element and the current passing through the unselected elements depends upon the front-to-back conduction ratio of the diodes. Very good diodes may have a ratio of 10,000; very poor ones may have a ratio of 100 or more. A ratio of 100 front-to-back for a diode results in selection with greater discrimination than the squareness ratio of even the best square loop cores. Consequently, the sharpness of selection is much better in the system of the present invention than in systems employing conventional current coincidence, even when the present system uses relatively poor diodes.

The sensing arrangement of the present invention is also different than the one conventionally employed. To sense whether or not a magnetic element is switched, the voltage induced on the column conductor to which the element is coupled is measured. This is done by coupling a sense conductor to each column conductor of the memory array through a diode. This arrangement has a number of advantages. One is that it is not necessary to have a sense conductor passing through the memory elements. Another is that the switching voltage which is sensed can be made substantial by appropriate magnetic element construction and appropriate switching current magnitude.

In the memory construction of the present invention, the memory array may include strips of doctor bladed ferrite laminated together to provide "cores" with the windings already in place. The diodes associated with each core may be batch fabricated on two semiconductor wafers between which the memory array is positioned. The core windings mate with the batch fabricated diodes when the memory array is in position between the two semiconductor wafers. The leads for the diodes, and the resistors required, are printed onto the wafers and in this way directly coupled to the appropriate diode terminals.

Some important advantages of the memory of the present invention include relatively high speed, relatively inexpensive construction, relatively high bit density, and ease of making units in modular form.

The invention is described in greater detail below and is illustrated in the following drawings of which:

FIGURES 6A–6K are various views of elements of the memory array of the present invention;

Figure 1:
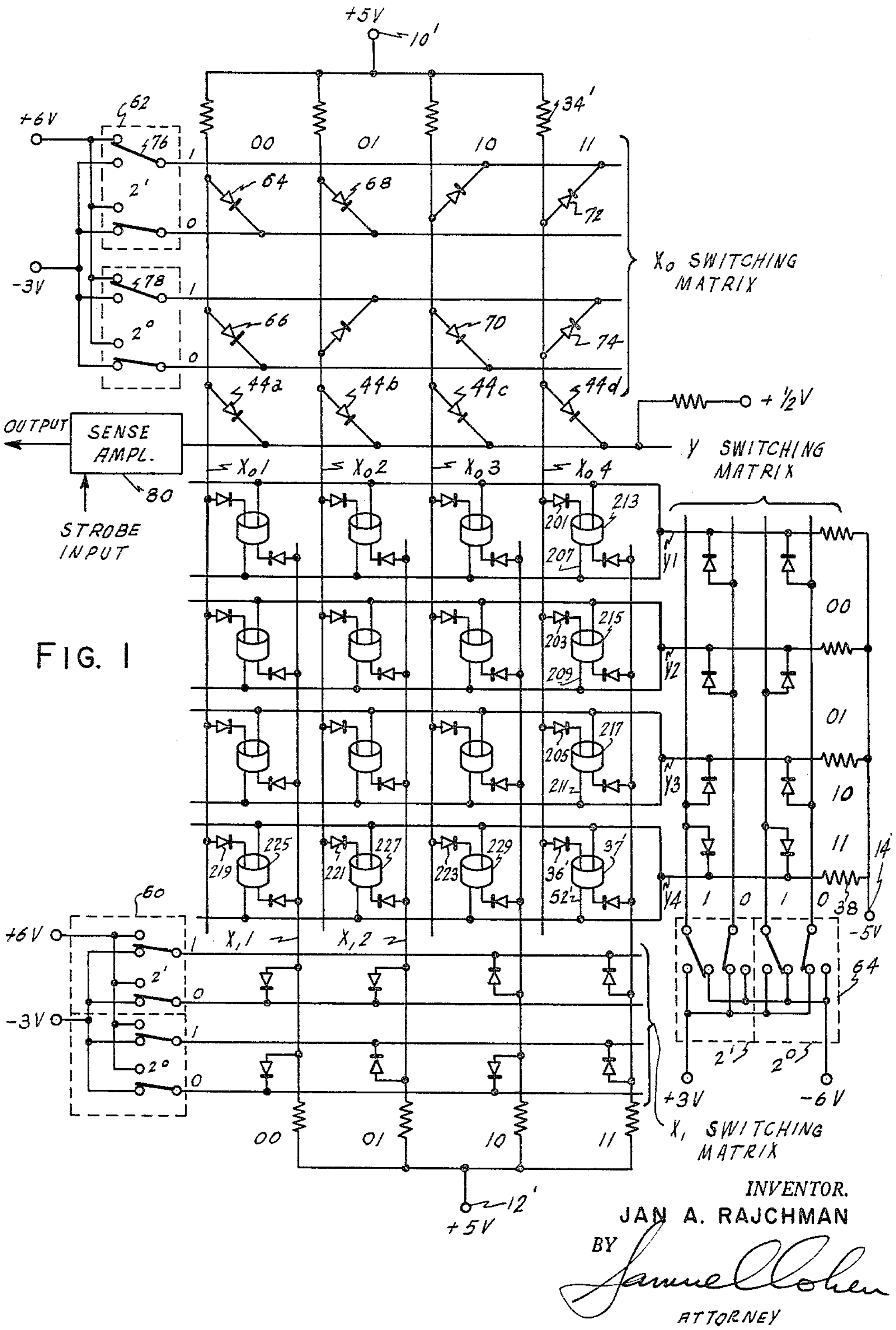
FIGURE 1 is a schematic drawing of a memory system according to the present invention.

The memory system shown in FIGURE 1 includes 3 switching matrices $X_0$, X and Y, the purpose of which is to select a storage location for reading or writing, and a plurality of magnetic elements ("cores") formed of a material such as ferrite, for storing binary information. For purposes of illustration, sixteen magnetic elements are shown. However, it should be appreciated that in practice the memory may be much larger than this. There are two windings passing through each magnetic element and there is a diode in series with each winding. Thus, each memory position requires two diodes and one core.

The switching matrices each include a plurality of diodes and switching elements (such as 62) connected to the diodes for controlling the diodes. In FIGURE 1, the switching elements are shown as mechanical switches. However, in practice these switches may be transistors, diodes or similar electronically controlled switching elements. As there are 16 storage locations, each switching matrix includes 8 diodes, as is discussed in more detail later. As will also be shown in more detail later, in order to write a zero into a storage location the $X_0$ and the Y switching matrices are employed and in order to write a one into a storage location, the $X_1$ and Y switching matrices are employed.

In this memory, a separate sense winding passing through each core is not required. Instead, the sense amplifier is connected through diodes to the $X_0$ lines of the memory. The operation of the sense amplifier is discussed in more detail later.

Figure 2:
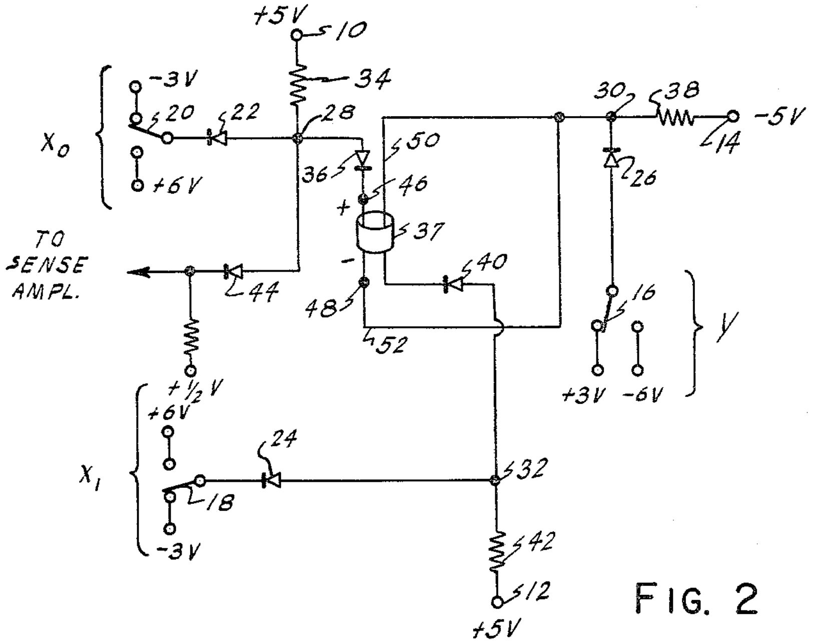
FIGURE 2 is a drawing to help explain the operation of the system of FIGURE 1.

The operation of the memory system of FIGURE 1 may be more clearly understood from FIGURE 2. The latter figure shows one core 37 of the memory system and one of the diodes of each of the switching matrices. Positive voltages are applied to terminals 10 and 12 and a negative voltage is applied to terminal 14. Switches 18 and 20 are initially in the —3-volt position and switch 16 is initially in the +3-volt position so that diodes 22, 24 and 26 conduct. When these diodes conduct, the voltages present at terminals 28 and 32 are —3-volts plus the voltage drop across the diodes 22 and 24, respectively, and the voltage present at terminal 30 is +3 volts minus the voltage drop across diode 26. Assuming silicon diodes and a 1 volt drop across the diodes, the voltages at points 28, 32 and 30 are —2 volts, —2 volts, and +2 volts, respectively. These voltages reverse bias diodes 36 and 40 so that no current flows through windings 50 and 52. Thus, with all switches in the position shown, core 37 does not switch.

In the actual operation of the memory, a storage location is first read out and then new information is written into the location. It may be assumed arbitrarily that the read portion of a read-write cycle corresponds to the writing of a "zero" into a memory location. Thus, if it is desired, during the write portion of the read-write cycle, to write a "zero" into a memory location it is not necessary to disturb that location (since it is already storing a "zero"). Nevertheless, for the sake of illustrating the operation of the system, the following discussion explains how a "zero" or "one" may be written and how a memory location is read out.

To write a "zero" into the memory, switches 20 and 16 are placed in the +6-volt and —6-volt positions, respectively, reverse biasing diodes 22 and 26. This causes terminal 28 to tend to become positive and terminal 30 to tend to become negative. The voltage difference is sufficient to cause an appreciable amount of current to flow through diode 36 and winding 52. This current causes the ferrite core 37 to become saturated in a direction corresponding to storage of the binary bit zero.

During the time switches 20 and 16 are in the +6- and —6-volt position, switch 18 remains in the —3-volt position. Thus, the voltage at point 32 is at rightly —2 volts. The current flow through the path consisting of resistor 34, diode 36 and resistor 38, at the time the core 37 is in its "zero" state causes a voltage to develop at point 30. The values of resistors 34 and 38 and source voltages are so chosen that the voltage at point 30 is roughly —½ volt. For example, resistors 34 and 38 may be of equal value and the voltages applied to terminals 10 and 14 may be +5 volts and —5 volts, respectively, as shown. Thus, diode 40 is reverse biased (—2 volts at its anode and —½ volt at its cathode) and no current flows through winding 50 during the time current is flowing through winding 52.

To write a "one" into the core, switch 20 is placed in the —3-volt position, switch 18 is placed in the +6-volt position, and switch 16 is placed in the —6-volt position. This causes diodes 26 and 24 to cut-off and diode 22 to conduct and a voltage difference develops between points 32 and 30. Current now flows through diode 40 and winding 50. The current direction and magnitude are such that the core 37 becomes saturated in a direction corresponding to storage of the binary bit one. As in the case of writting a zero, the voltage difference between terminals 28 and 30 is such that diode 36 is reversed biased (—2 volts at its anode and —½ volt at its cathode) so that no current flows through winding 52 during the time current flows through winding 50.

Reading from a core corresponds to writing a "zero" into the core. To read from core 37, switch 18 is placed in the —3 volt position while switches 20 and 16 are in the +6 volt and —6 volt positions, respectively. Current now flows through diode 36 and winding 52. If core 37 is in a state of saturation corresponding to storage of the binary bit one, the current passing through winding 52 causes the core to switch to the opposite state of saturation. The switching of the core causes a voltage to be induced between terminals 46 and 48 of winding 52. The polarity of the voltage is as indicated, namely plus at terminal 46 and minus at terminal 48. This induced voltage is the so-called back E.M.F. (electromotive force). The polarity of the back E.M.F. is in a sense to tend to reduce the inducing current, according to Lenz' law. It might also be mentioned that the voltage induced on the winding linking the core increases as the axial length of the core increases. As will be seen shortly, the present core can be made to have a relatviely long axial dimension compared with the core diameter.

During the switching of the core to the "zero" state, diode 36 is in a conducting condition so that a positive voltage appears at terminal 28. This positive voltage is in a sense and of an amplitude to forward bias the diode 44 leading to the sense amplifier. In a practical circuit, the positive voltage developed at point 28 may be +1½ volts or so. The sense amplifier can be strobed during the read interval, that is, a pulse may be applied to the sense amplifier to condition it to conduct upon the receipt of a positive pulse at the anode of the diode 44. This strobing is not necessary, to obtain a good signal as in current coincident memories, and need be used only if it is desired to cut-off the read signal during a "write-zero" operation. Thus, the positive pulse passes through the diode 44 and is amplified by the sense amplifier and applied to other circuits (not shown) in the data processing machine (not shown).

If, during the read interval, the core 37 is in a state of saturation corresponding to storage of the binary bit zero, the current flowing through winding 52 induces no appreciable voltage across terminals 46 and 48, since the current flowing in winding 52 merely drives the core 37 further into saturation. Under these conditions, the voltage appearing at terminal 28 is +½ volt or so and diode 44 does not conduct to any appreciable extent. The signal read by the sense amplifier then corresponds to zero volts, which signal is arbitrarily assigned the value binary zero.

Returning to FIGURE 1, the switches in bank 60 are all shown in the —3-volt position whereas certain of the switches in banks 62 and 64 are in the +6-volt and —6-volt positions, respectively. Referring now particularly to the $X_0$ switching matrix, with the switches 62 in the position shown, diodes 64, 66, 68 and 70 conduct. This places the $X_0$1, $X_0$2 and $X_0$3 lines at roughly minus 2 volts. However, diodes 72 and 74, which are connected through switches 76 and 78 to +6 volts do not conduct so that lead $X_0$4 is initially at the voltage of the supply terminal 10′.

Analysis of the Y switching matrix similar to the analysis above shows that the only one of the Y leads not at roughly +2 volts is lead $Y_4$. This lead is initially at the negative voltage of supply terminal 14′. Therefore, a voltage difference exists between leads $X_0$4 and $Y_4$ and current flows through winding 52′ and diode 36′. This current flow is in a direction to switch core 37′ into a state of saturation corresponding to storage of the binary bit zero.

When the core 37′ has switched into the "zero" state the voltage present on the $X_0$4 column lead is roughly +½ volt and the voltage present on the Y4 lead is roughly —½ volt. The voltage present on the Y1, Y2 and Y3 leads is roughly +2 volts. Therefore diodes 201, 203 and 205 are reverse biased and no current flows through the windings 207, 209 and 211 of cores 213, 215 and 217. In a similar manner, diodes 219, 221 and 223 are reverse biased so that by-pass current does not flow through the windings of cores 225, 227 and 229. During the time core 37′ is switching, the voltage on column and row windings $X_0$4 and Y4 is somewhat higher, +1½ volts and 1½ volts, respectively. However, this is still insufficient to forward bias any of the diodes 201, 203, 205, 219, 221 or 223 so that the information stored in the cores associated with these diodes remains undisturbed.

By manipulation of the switches of the storage matrix $X_1$ and Y in the manner similar to that discussed above, the binary bit one may be written into any of the cores selected in the memory.

The coupling diodes to the sense amplifier are shown at 44*a*, 44*b*, 44*c* and 44*d* in FIGURE 1. The sense amplifier itself is illustrated at 80.

Figure 3:
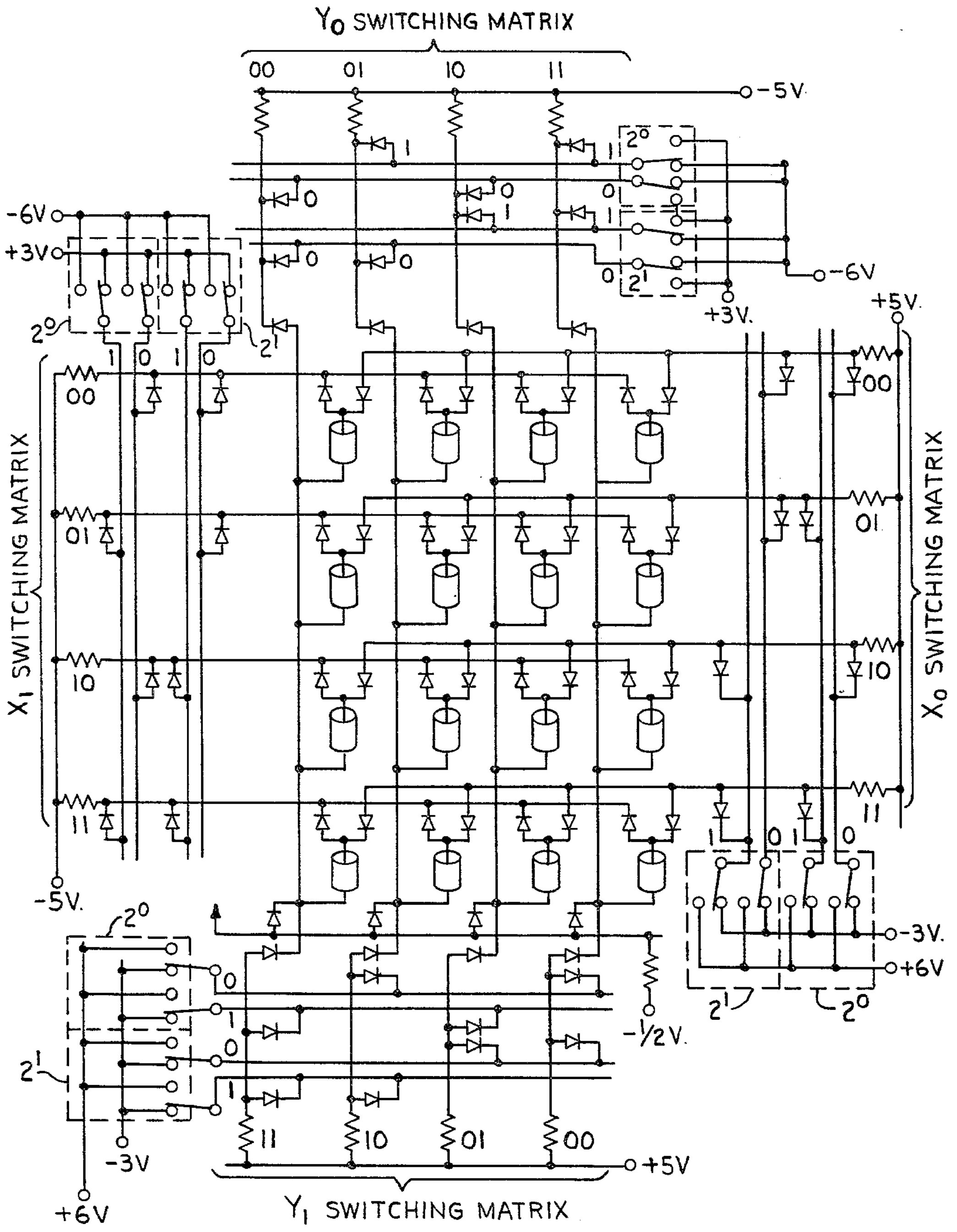
FIGURE 3 is a schematic drawing of a second embodiment of a memory system according to the present invention.

A second embodiment of the memory system of the invention is shown in FIGURE 3. In this embodiment there is only one winding passing through each ferrite "core." However, there are two diodes associated with each core. Four rather than three switching matrices are required. The $X_0$ and $Y_0$ matrices are used for the purpose of writing a zero into a memory location, and the $X_1$ and $Y_1$ matrices are for the purpose of writing a one into a memory location. As in the case of the previous embodiment, writing a zero into the memory corresponds to the read-out of a memory location.

Figure 4:
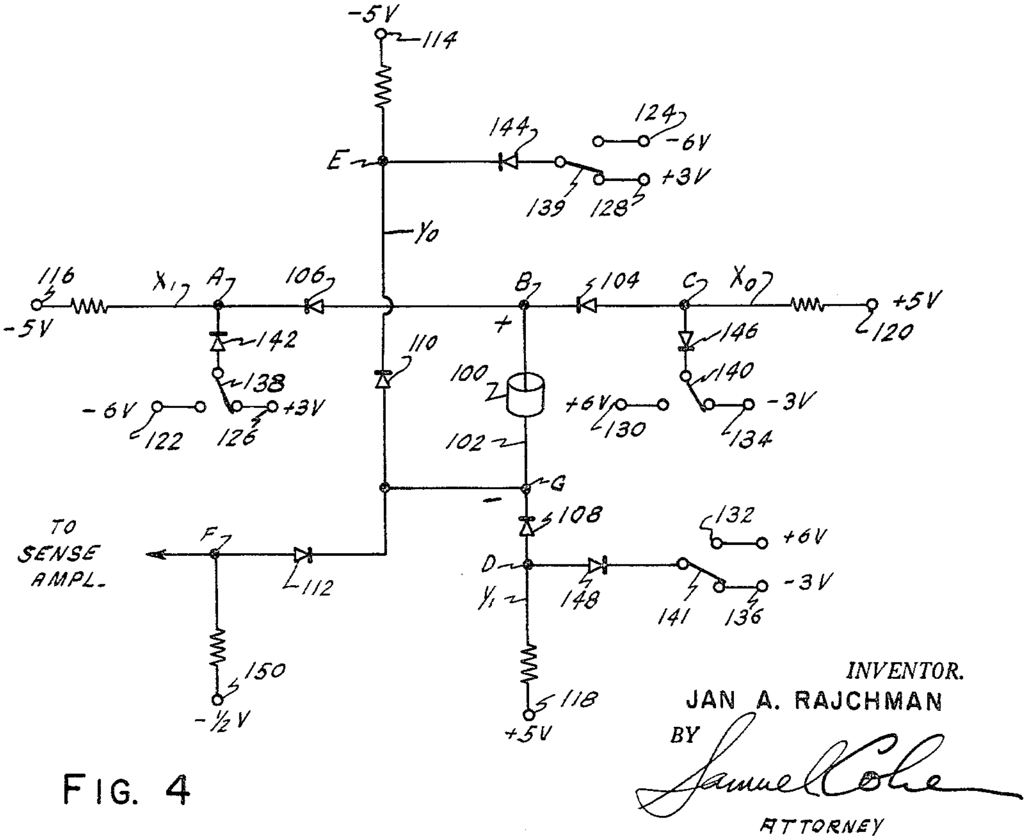
FIGURE 4 is a schematic drawing to help explain the operation of the system of FIGURE 3.

The operation of the memory of FIGURE 3 may be better understood from a consideration of FIGURE 4. It includes a single storage element, ferrite core 100. There is a single winding 102 passing through the core and two diodes, namely 104 and 106 associated with the core. Diodes 108 and 110 which are in series with the $Y_0$ and $Y_1$ lines, respectively, are for the purpose of decoupling. When the $Y_0$ line is used, diode 108 decouples the $Y_1$ line and when the $Y_1$ line is used, diode 110 decouples the $Y_0$ line. These diodes are not necessary in the memory system of FIGURE 1. Diode 112 leads to the sense amplifier.

The power supply voltages for the memory system are −5 volts applied to terminals 114 and 116 and +5 volts applied to terminals 118 and 120. The bias voltages are −6 volts applied to terminals 122 and 124, +3 volts applied to terminals 126 and 128, +6 volts applied to terminals 130 and 132 and −3 volts applied to terminals 134 and 136.

With the switches 138–141 in the positions shown the switching matrix diodes 142, 144, 146 and 148 all conduct. Assuming again that the diodes are silicon diodes and a voltage drop of roughly 1 volt occurs across a diode when it conducts, the values of voltages present are roughly as follows: A=+2 volts; C=−2 volts; D=−2 volts; E=+2 volts. These voltages back bias diodes 104, 106, 108 and 110 so that substantially no current flows through winding 102. Point B in the circuit essentially floats.

If it is desired to write a zero, switch 139 is placed in the −6 volt position and switch 140 is placed in the +6 volt position. Switches 141 and 138 remain in the positions shown, namely at −3 volts and +3 volts, respectively. The voltages present at terminals C and E are now such that diodes 104 and 110 become forward biased and conduct current through winding 102 in a sense to cause the core 100 to become saturated in a direction corresponding to the storage of the binary bit zero. When the core is in its zero state, the voltages present at various points in the circuit are roughly as follows: A=+2 volts; B=0; C=+1 volt; D=−2 volts; and E=−1 volt. The voltages present are such that diodes 108 and 106 are back biased so that none of the core driving current is by-passed through these diodes.

To write a one into the memory, switch 138 is thrown to the −6-volt position and switch 141 is thrown to the +6-volt position while switches 140 and 139 remain in the +3-volt and −3-volt positions, respectively. This causes diodes 144 and 146 to conduct and diodes 142 and 148 to be cut-off. The voltages at points A and D are now such that diodes 106 and 108 are forward biased and conduct current through winding 102 in a direction to cause the core 100 to saturate in a direction corresponding to storage of the binary bit one. After the core is in its one state, the voltages present at various points in the circuit are: A=−1 volt; B=0; C=−2 volts; D=+1 volt; E=+2 volts. These various voltages back bias diodes 110 and 104 so that none of the core driving current is diverted by these diodes.

As in the case of the memory of FIGURE 1, reading from the memory corresponds to writing a zero to the memory. To read out the core 100, switches 139 and 140 are thrown to the −6-volt and +6-volt positions, respectively while switches 138 and 141 remain in the +3-volt and −3-volt positions, respectively. Diodes 104 and 110 are forward biased and a current flows through winding 102 in a direction to switch the core to its zero state. If the core is initially in its one state a voltage is induced in its winding 102 during the time it switches and a voltage of the polarity indicated develops across terminals B and G. The amplitude of this voltage depends upon the switching current magnitude and the characteristics of the core. As previously mentioned, a core with a relatively large axial length will produce a relatively large value of voltage across BG, when switching. By way of example, the voltage across terminals B and G may be of the order of 3 volts or more. During the switching of the core, the voltages present at various points in the circuit may be as follows: A=+2 volts; B=+1½ volts; C=+2½ volts; D=−2 volts; E=−2½ volts and G=−1½ volts. Diode 112, which leads to the sense amplifier, is normally back biased by the −½ volt present at terminal 150. If during the read out point G assumes a value of −1½ volts, corresponding to the switching of the core from the one to the zero state, diode 112 becomes forward biased and a positive voltage develops at F. This positive voltage is applied to the sense amplifier to amplify the sensed voltage. The amplifier may be strobed during the read interval.

If during the read portion of the read-write cycle the core 100 is in the "zero" state, the current flowing through winding 102 induces a voltage at points B and G which is at or close to zero volts so that diode 112 remains back biased and a negative voltage about −½ volt appears at E. The sense amplifier, therefore, produces a zero output signal corresponding to the binary bit zero.

Returning for a moment to the complete system shown in FIGURE 3, the operation of the various switching matrices is the same as the ones of FIGURE 1. In the positions of the switches shown, no current flows through any of the cores. Control of the switches in $X_0$ and $Y_0$ switching matrices control the writing of a zero into the memory and control the switches in the $X_1$ and $Y_1$ switching matrices and controls the writing of a one into the memory. As in the embodiment of FIGURE 1, although mechanical switches are shown associated with the matrices, it is to be appreciated that in practice electronically controlled devices such as diodes or transistors may be employed instead of switches.

Figure 9:
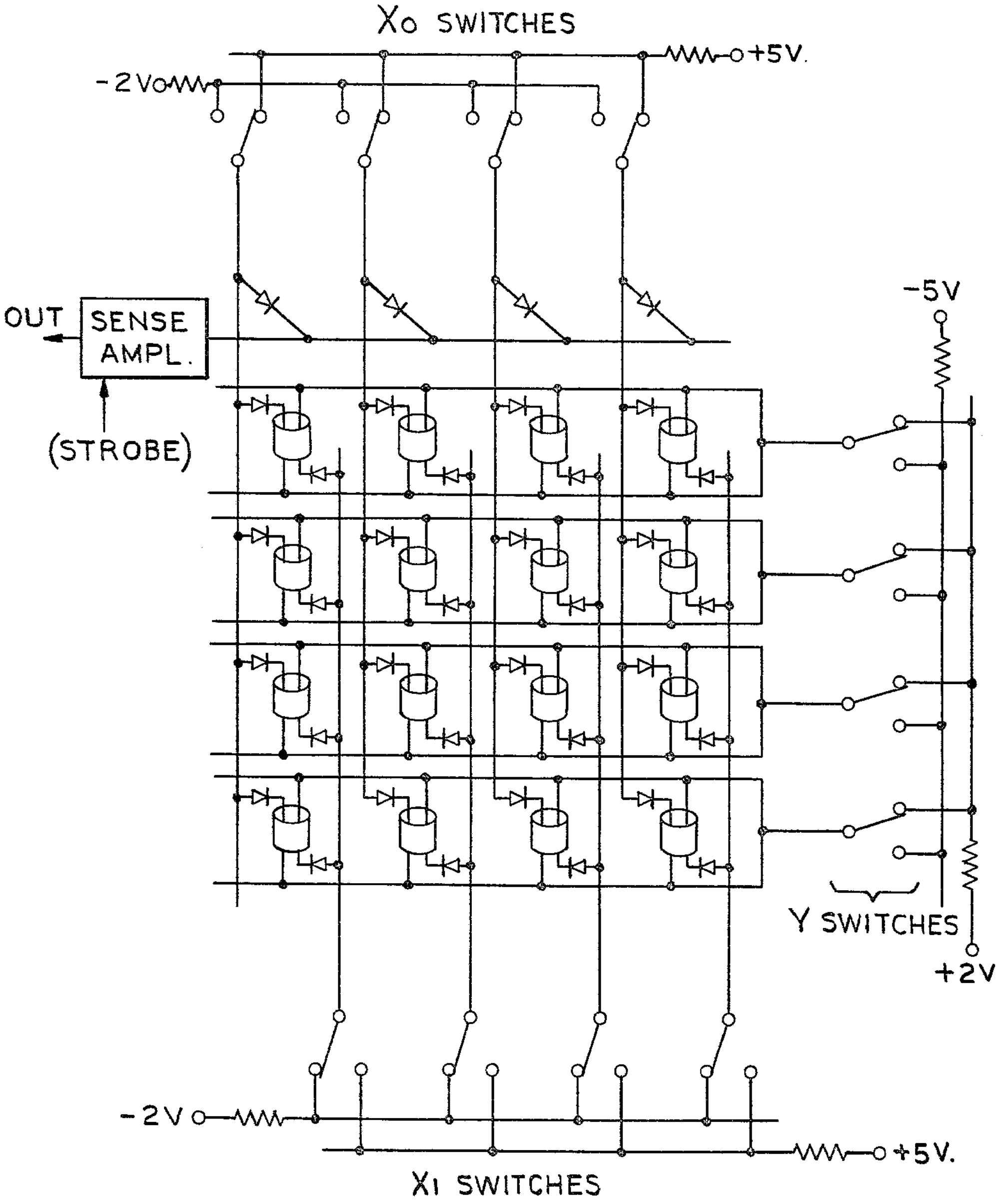
FIGURE 9 is a schematic drawing of a third embodiment of a memory system according to the invention.

The systems shown in FIGURES 1 and 3 employ a particular type of diode switching matrix. It is to be understood that other types of switching matrices may be used instead. Further, the system is operative with direct connections through switches to various voltages for selection of a particular storage location and with the diode switching matrices omitted entirely. FIGURE 9 illustrates a memory of this type. The operation of this memory is believed to be self-evident from the explanations which have already been given of the memory systems of FIGURES 1 and 3.

Figure 5:
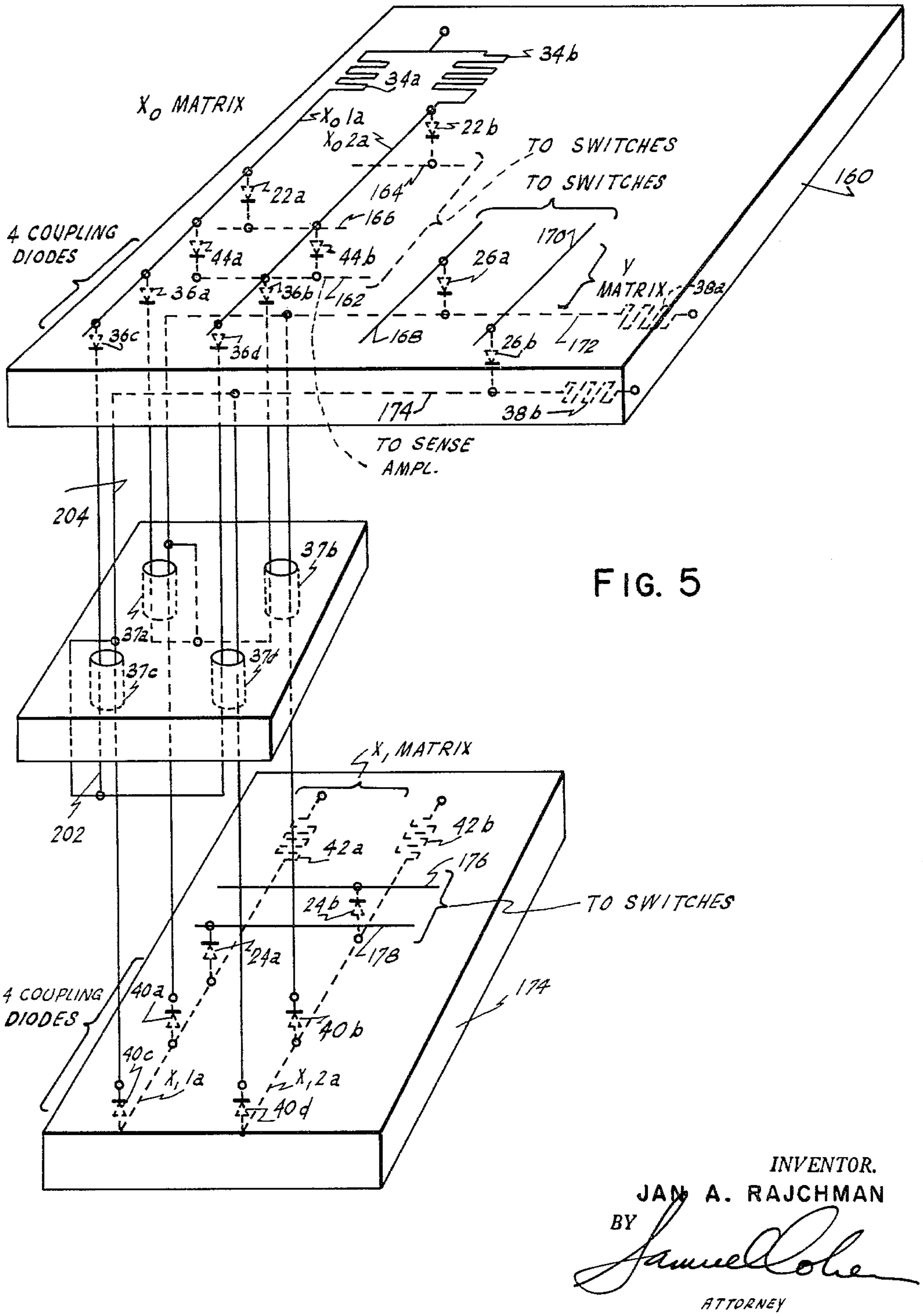
FIGURE 5 is a schematic, exploded view of a memory system similar to the one of FIGURE 1 showing relative positions of the various elements.

A schematic exploded view of a memory structure embodying the present invention is shown in FIGURE 5. This memory corresponds to the system of FIGURE 1. To aid in following the drawings the same reference numerals have been used to identify elements as in FIGURE 2. However, letters follow the reference numerals. Also, to simplify the drawing, the memory is shown to have only four storage locations. Similarly the $X_0$, $X_1$ and Y matrices each have only two diodes.

The four stages locations are shown as ferrite cores *37a*, *37b*, *37c* and *37d*. In practice, as will be shown shortly, these "cores" may be made of doctor bladed ferrite strips which are laminated together to provide a unitary structure. The upper coupling diodes for the cores appear in the upper block 160. They are shown at *36a*, *36b*, *36c* and *36d*. As will be shown shortly, in practice, this block 160 may be a semiconductor wafer on which diodes are formed at the lower surface, and which includes printed wires both on its lower and upper surfaces for connection to the diodes. For example, the wires $X_01a$ and $X_02a$ are printed on the upper surface of the wafer 160 and connect to the anodes of the diodes 36.

The diodes *44a* and *44b* are formed in the same semiconductor wafer 160 as the coupling diodes 36. These diodes are connected at their anodes to the $X_01a$ and $X_02a$ windings, respectively, and are coupled to their cathodes to the lead 162 leading to the sense amplifier. The resistor leading to the ½-volt bias supply may be printed on the lower surface of wafer 160. However, for the sake of drawing simplicity it is not shown in FIGURE 5.

The $X_0$ switching matrix consists of diodes 22*a* and 22*b*. These diodes are connected at their anodes to the $X_01a$ and $X_02a$ printed wires, respectively, and at their cathodes to printed wires 166 and 164, respectively. The latter printed wires are on the lower surface of wafer 160.

Resistors corresponding to the load resistor 34 of FIGURE 2 appear at 34*a* and 34*b*. These resistors may be thin film resistors which may be vacuum evaporated or otherwise printed on to the upper surface of wafer 160.

The Y matrix consists of diodes 26*a* and 26*b*. These are connected at their anodes to printed wires 168 and 170 on the upper surface of the wafer and at their cathodes to printed wires 172 and 174 on the lower surface of the wafer. The latter wires are connected to resistors 38*a* and 38*b* on the lower surface of the wafer. These resistors correspond to resistor 38 of FIGURE 2 and terminate in terminals to which voltage sources may be connected. The wires 168 and 170 on the upper surface of the wafer lead to switches (not shown) corresponding to switch 16 of FIGURE 2.

The lower wafer 174 like the upper wafer 160 is preferably formed of semiconductor material. The diodes 40*a*, 40*b*, 40*c* and 40*d* correspond to the coupling diode 40 of FIGURE 2. They are connected at their anodes to the $X_11a$ and $X_12a$ printed wires, respectively. The printed wires are located on the lower surface of the wafer 174. These wires lead through resistors 42*a* and 42*b* to terminals to which a voltage source may be connected.

The $X_1$ matrix consists of diodes 24*a* and 24*b*. These diodes are connected to wires $X_11a$ and $X_12a$ and at their cathodes to wires 176 and 178. Wires 176 and 178 are in the upper surface of wafer 174 and lead to switches corresponding to switch 18 of FIGURE 2.

Figures 6A, 6B, 6C, 6E, 6F, 6G:
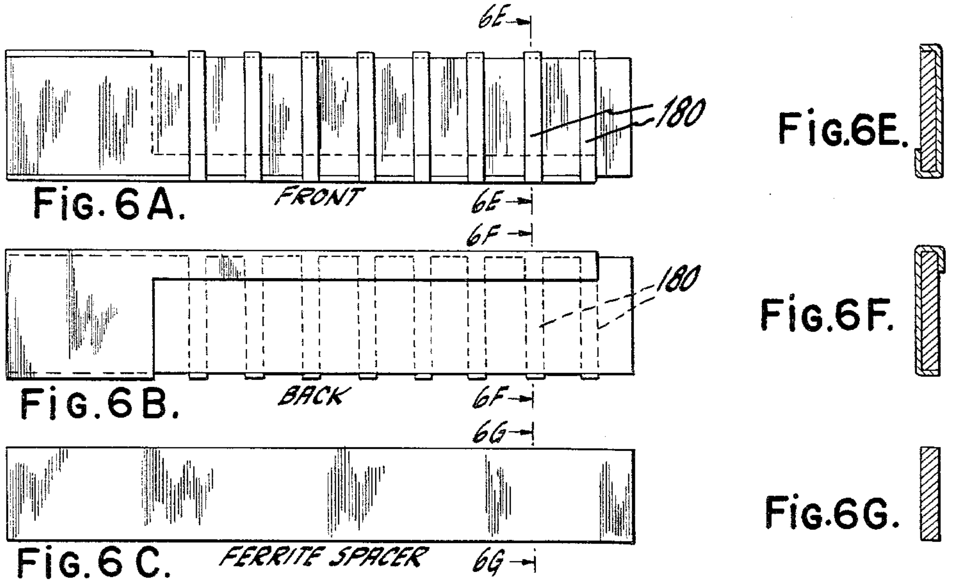
Figure 6D:
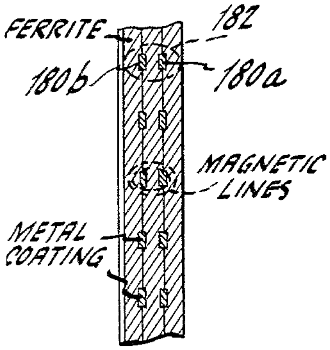
Figure 6H:
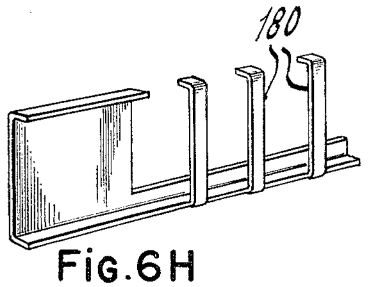
Figures 1, 6:
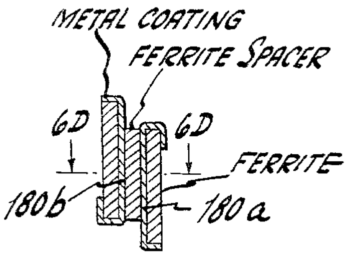
Figure 6J:
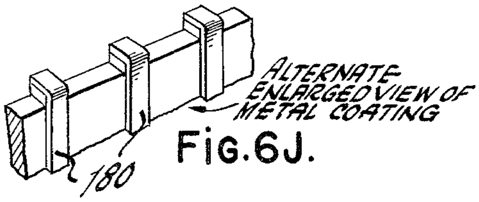
Figure 6K:
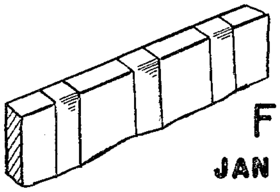

A more detailed showing of one form of construction of the memory array itself appears in FIGURES 6A to 6K. FIGURES 6A and 6B show a ferrite strip with a coating of metal in a particular pattern thereon. As will be seen shortly, the metal strips such as 180 form the windings which pass through the cores. The core material consists of the ferrite on which the metal strips are placed. The metal strips may extend above the surface of the ferrite as shown in more detail in FIGURE 6J or may be flush with the surface of the ferrite as is shown in FIGURE 6K. The latter construction is a preferred one.

Two strips, such as shown in FIGURE 6B, may be placed one on each side of a ferrite spacer strip such as shown in FIGURE 6C. The three strips may be of "green" ferrite, as discussed shortly. To provide a unitary structure, the three strips are fired and the arrangement best shown in FIGURES 6D and 6I is obtained. In FIGURE 6D, for example, the area within the dashed circle 182 corresponds to a ferrite core. The two windings passing through the core consist of the two conductors 180*a* and 180*b*. A cross-sectional view along section I—I of FIGURE 6D appears in FIGURE 6I.

The ferrite strips discussed above may be made by so called "doctor bladed" techniques generally as follows. A slurry of ferrite, obtained by mixing the appropriate ferrite powders with an organic material, is spread on a glass or other flat surface. A steel blade, very sharp and straight, is maintained at a given height over the glass plate and pulled over it so as to leave a layer of ferrite on the glass that has a definite thickness determined by the height of the blade over the glass. The ferrite sheet can be stripped off from the glass quite easily, for example, by pouring some water between the ferrite and the glass. There is obtained in this way so-called "green" sheets of ferrite which have the approximate consistency of paper.

Figure 16:
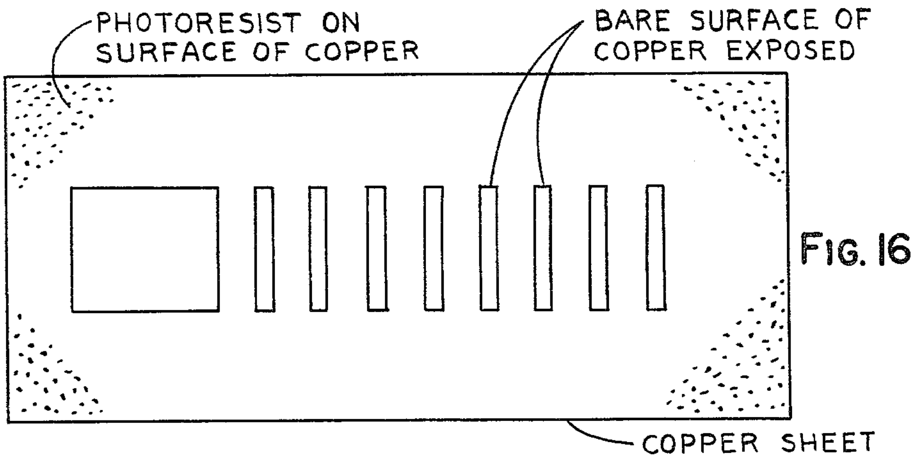
FIGURES 16 and 17 illustrate steps in a method of constructing a memory array used in the present invention.

The metal conductors (such as 180 in FIG. 6) which serve as "core" windings may be made flush with the surface of the ferrite strip by following the method described generally in application Serial No. 201,545, Method of Making Insulating Material With Imbedded Conductors, filed June 11, 1962, by R. Shahbender and C. H. F. Morris, and assigned to the same assignee as the present application and now abandoned. The process starts with a copper sheet over which a plastic coating is applied in a described pattern by the well-known photoresist process. The photoresist is then exposed to a pattern corresponding to the conductors desired inside of the ferrite. Then the unexposed photoresist is removed leaving bare the places on the copper surface where the conductors are desired in the ferrite, as shown in FIG. 16.

The copper sheet is then plated with a metal that can withstand the high temperature at which the ferrite has to be heat treated. Palladium, platinum and rhodium are such metals. The plating is done in such a way as to obtain a relatively spongy deposit.

After the plating, the photoresist is dissolved. This leaves the copper sheet with a pattern of patinum conductors on its surface. Now the ferrite slurry is spread ("doctor bladed") on top of the copper and over the platinum conductors. The copper sheet is then dissolved in an acid which does not attach the ferrite or the platinum. There remains the green ferrite sheet with platinum or other metal imbedded in the ferrite, as shown in FIG. 17.

Figures 10, 11, 12:
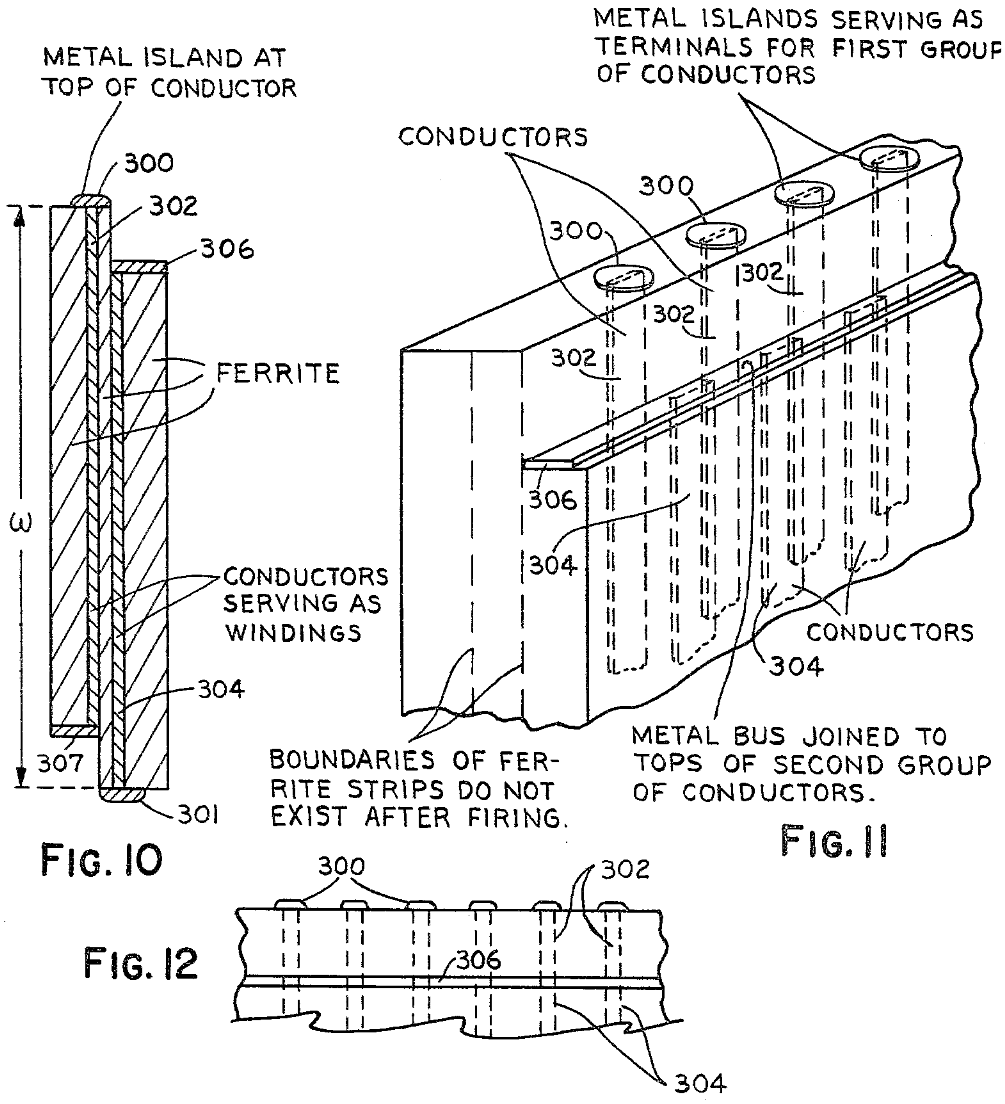
FIGURES 10, 11 and 12 are cross-sectional, perspective and plan views illustrating a preferred form of memory array construction of the present invention.
Figure 17:
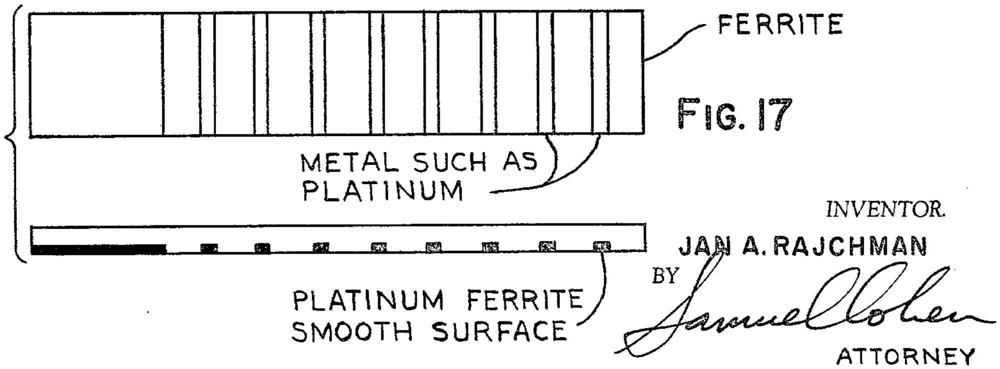

Two sheets of the type above may be made with the pattern shown in FIG. 17, which is really the same as that shown on the earlier FIG. 6. (The only exception is the large surface to the left which is put on the same side in FIG. 17 as the fine lines, rather than the opposite side as in FIG. 6. Both constructions are suitable.) These two ferrite strips are then sandwiched together with an intervening spacer ferrite to form a sandwich as shown in FIG. 10 with a slight displacement between the two patterned sheets. Note incidentally that the spacer is somewhat wider (dimension $\omega$ in FIG. 10) than either of the two patterned sheets.

The sandwich is now compressed in a press and heated in the press to about 100° or 200° C. After this operation, the sandwich is heat treated at a temperature of about 1400° C. to obtain the desired magnetic properties in the ferrite. In this way, all of the flat strips that comprise all the elements of a given row of the array may easily be obtained.

The edges of the strips may be polished, that is, the top and bottom ends of the ferrite strips can be polished and little islands 300 of indium, indium lead or similar material are deposited on top of the platinum or other material conductors 302. In a similar manner, islands 301 are deposited on the opposite end of the conductors 304. The islands 300 and 301 are shown in FIG. 10 and the islands 300 are shown in perspective in FIG. 11 and in plan view in FIG. 12. These islands 300 and 301 provide good electrical contact to the conductors 302 and 304, respectively, and serve as the connection terminals to the diodes in the semiconductor wafer, as is discussed shortly.

The opposite ends of the conductors 304 may be interconnected by a common bus 306 made of indium, indium lead or a similar metal. This bus, like the islands, may be deposited right on the polished end of the ferrite strip in which the conductors 304 are imbedded. A similar bus 307 connects to the opposite end from the islands 300 of the conductors 302.

Another method of construction which is suitable for making a memory array such as discussed above is described in application Serial No. 201,626, Insulated Material With Imbedded Conductors and Method of Making Same, filed June 11, 1962, by R. L. Noack and assigned to the same assignee as the present application. Terminals at the ends of the conductors passing through the ferrite material may be applied to the memory array in the manner shown in FIGURES 10 and 11 of the present application and discussed in detail above.

After the rows such as shown in FIGURES 10 and 11 are made up, successive rows may be assembled parallel to one another with some spacing material between them. These spacers act to produce a monolithic structure. The spacers can be epoxy, waxes or may be ceramic material of the same general mechanical properties of the ferrite but non-magnetic. Instead of insulating spacers, metal spacers which provide some shielding and serve also the function of conducting to the outside the heat generated in the ferrite during operation, acting thus as cooling fins, may be used.

Figure 7:
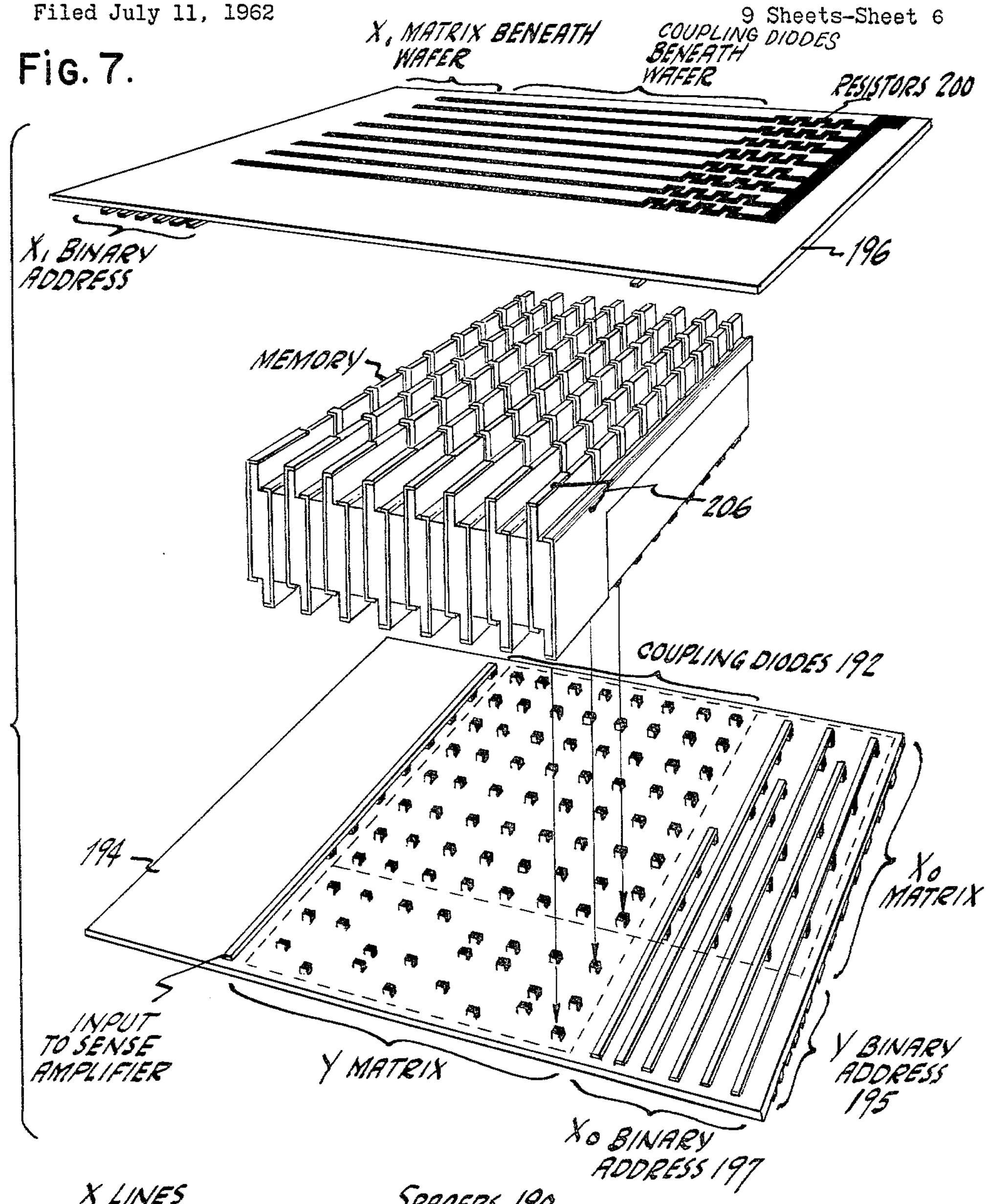
FIGURE 7 is an exploded perspective view of a memory system according to the present invention. This drawing shows certain constructional details.
Figure 8:
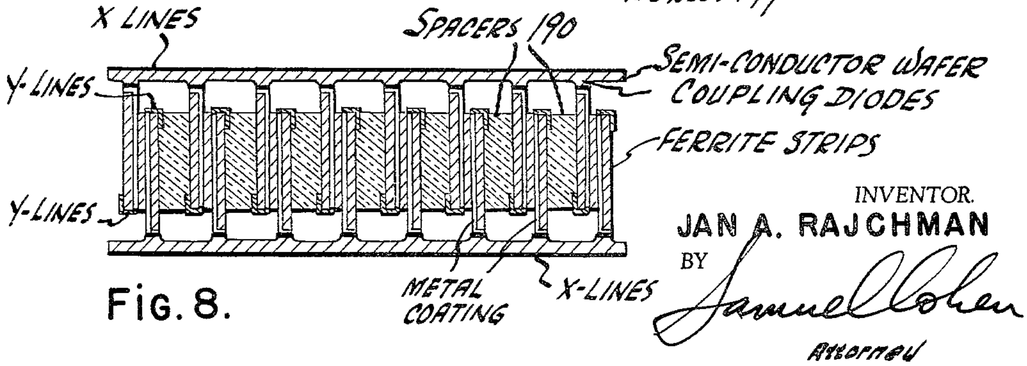
FIGURE 8 is a cross-section through a memory system according to the invention. This figure also shows certain constructional details.

FIGURES 7 and 8 both show two dimensional arrays of ferrite cores made up by assembling successive rows parallel to one another as discussed in the preceding paragraph. The spacers 190 are shown in the cross-sectional view of FIGURE 8 and are also shown in FIGURE 7.

FIGURE 7 illustrates, at 192, an array of 64 coupling diodes. These diodes correspond to the diodes 36 of FIGURE 5. There are 64 diodes shown since in this illustration (FIGURE 7) the memory array has 64 cores. These diodes, the diodes for the switching matrices and the diodes which couple to the sense conductor are preferably made by a batch fabrication technique such as described generally in Patent No. 2,972,092, Semiconductor Devices, issued February 14, 1961, to H. Nelson and assigned to the same assignee as the present application.

Figure 13:
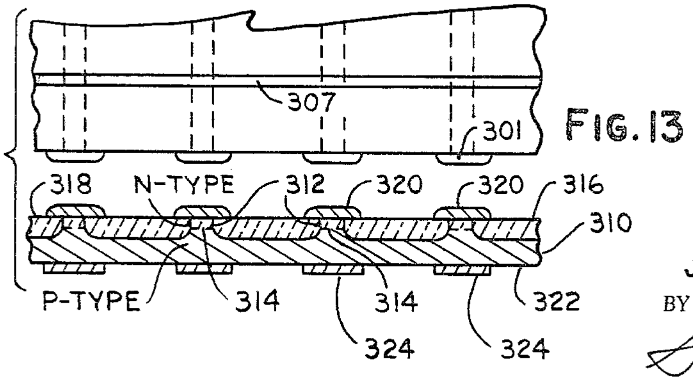
FIGURES 13 and 14 are cross-sectional views illustrating a portion of the semiconductor wafer with diode mesas and a portion of the memory array, both of an embodiment of the present invention.

In brief, as shown in FIGURE 13, a slab of semiconductor material 310 which may be silicon or the like is used as the semiconductor wafer. The slab may be of the order of one inch square in surface area and may have a thickness of the order of 5 to 10 mils. This wafer may be semiconductor material of P type. In this case, one surface of the wafer is suitably processed to be of N type. (Alternatively, the bulk of the wafer may be of N type and the surface processed to be of P type.) The wafer is then covered with a photoresist, suitably masked, and exposed to light so that an array of dots is formed which is protected from subsequent etching steps. The semiconductor is then placed in an acid which dissolves the semiconductor material between the dots and leaves little mesas on the surface of the semiconductor material. These mesas are shown at 312 in FIGURE 13 and include N type material with a P–N junction 314 between each mesa and the P type bulk of wafer 310. In other words, the mesas form diodes, the cathodes of which extend toward the islands 301 at the ends of the ferrite structure.

In the next operation, an insulating material 318 is coated over the semiconductor to obtain a flat surface 316. The surface 316 includes an array of diode terminals which are flush with the surface. Little dots 320 of tin, lead, lead-tin alloys or the like are then placed on top of these diode terminals. If desired, some antimony, phosphorus or other donor material may be included in the lead to insure an ohmic contact between the dots 320 and the mesa. Next, on the opposite surface 322 of the wafer 310 indium is alloyed or evaporated or otherwise deposited along lines 324 which extend into the paper as viewed in FIG. 13. These lines are conductors which serve as the connection to the other electrodes (the anodes) of the diodes, as is shown generally in FIGURE 5 at, for example, $X_12a$.

The foregoing description follows generally the teachings of the Nelson patent discussed above except for the conductors 324 at the lower surface 322 of the wafers. As already mentioned, if opposite polarity diodes are desired, the bulk 310 is made of N type material and the surface is made of P type material. In this case, since the islands 320 are to make ohmic contact to the P type material, they are preferably made of indium, indium lead, tin, or the like, and may include a small amount of acceptor material such as gallium or boron.

Figure 14:
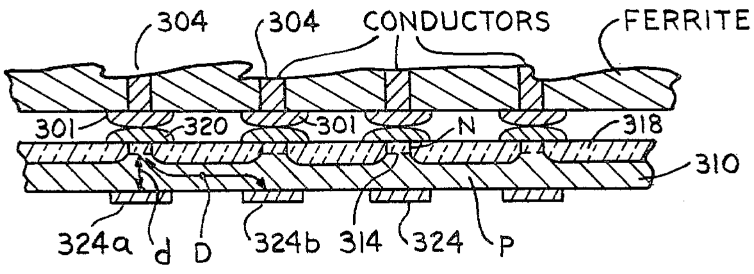

FIGURE 13 shows a portion of the ferrite structure and a portion of the array of semiconductors before the two are assembled together. FIGURE 14 shows the ferrite structure in contact with the array of semiconductor wafers. As can be seen in FIGURE 14, the array of mesas of semiconductor material matches exactly the islands which form terminals at one surface of the ferrite assembly. When the array of diodes is brought into contact with the memory array as shown in FIGURE 14 slight heating of the entire assembly melts the touching terminals 301, 320 and produces a solid block with all connections made. This is done, of course, on both sides of the magnetic assembly.

Figure 15:
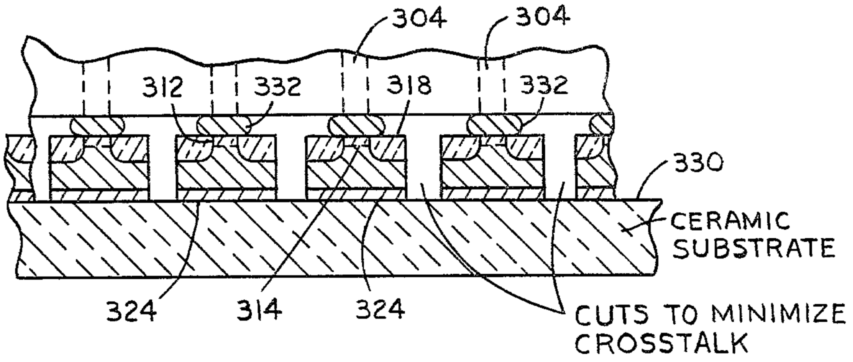
FIGURE 15 shows an alternative form of construction of the arrangement of FIGURE 14.

In the arrangement of FIGURE 14, the spacing *d* between a P–N junction and a conductor **324*a* should be substantially less than the spacing D between the P–N junction and the next adjacent conductor 324*b*. To insure this, the semiconductor wafer should be quite thin and the spacing between the mesas should be considerably longer than the thickness of the wafer. An alternative construction to further minimize any cross-talk is shown in FIGURE 15. Here, the wafer of semiconductor material with its conductors 324 is secured to a supporting substrate 330 formed of a ceramic or the like. The securing agent may be an organic adhesive such as epoxy. Then the semiconductor wafer is cut between the lines 324** to completely separate the rows of diodes and thereby to substantially eliminate any possibility of cross-talk. The arrangement of FIGURE 15 also has the advantage that it is of rugged construction, and there is no need to depend upon the mechanical strength of the semiconductor wafer rather than that of the supporting substrate.

In the arrangement of FIGURE 14, the memory array is in place against the ferrite array but the entire assembly has not yet been heated. Therefore, the islands 301 and 320 have not yet melted. The arrangement of FIGURE 15 shows the structive after the heating step. Now the connection between the conductors 304 and the mesas 312 is a single dot 332 which consists of the two dots 301 and 320 of FIGURE 14 melted together.

Returning now to FIGURE 7, note that the cathodes of all the diodes in the array 192 face the memory array. These cathodes of the diodes 192 engage the windings corresponding to **180*a* (FIGURES 6I and 6D—or the terminals 301 or the windings 304 of FIGURES 10 and 11), when the wafer 194** is placed against the memory or array.

The coupling diodes corresponding to diodes **40*a* of FIGURE 5 are located in the lower surface of the upper wafer 196. These diodes are located to mate with the windings 180*b* (FIGURE 6I) of the cores when the wafer 196** is in physical contact with the memory array.

The Y matrix and the $X_0$ matrix are fabricated on the lower semiconductor wafer 194, as shown. The connections to the Y matrix are a group of printed wires 195 on the lower surface of wafer 194 corresponding to wires 168 and 170 of FIGURE 5. The connection to the diodes of the $X_0$ matrix are printed wires 197 on the upper surface of wafer 194. These wires correspond to the wires 164 and 166 of FIGURE 5.

The $X_1$ matrix is located beneath the upper wafer 196. The connections to the diodes of this wafer are via a group of wires 198 on the lower surface of the wafer 196. This group of wires corresponds to wires 176 and 178 of FIGURE 5.

FIGURE 7 shows the resistors 200 on the upper surface of wafer 196. These correspond to the resistors

42a and 42b of FIGURE 5. The resistors for the $X_0$ matrix and Y matrix may be printed on the lower wafer 194 in a similar manner. However, for the sake of drawing simplicity, they are not shown in FIGURE 7.

As may be seen in FIGURE 5, one of the windings such as 202 which extends from one side of a core must be connected with the winding 204 at the other side of the core. Such a connection may be fabricated into the memory. However, it is shown schematically in FIGURE 7 as a connection 206 between the two common tabs of one group of cores. It is to be understood that similar connections are present for every group of cores.

The structure of a memory system such as shown in FIGURES 3 or 9 is quite analogous to that of the memory system of FIGURE 1. It is, therefore, not illustrated separately. It is to be understood that in the memory system of FIGURE 3, four diode switching matrices rather than three are employed and there is only one winding through each core. The four matrices would be located two on the upper wafer and two on the lower wafer as for example $X_0$ and $Y_0$ on the lower wafer and $X_1$ and $Y_1$ on the upper wafer. The use of a single windin per core makes the core construction somewhat simpler in that a core may be formed of only two strips (the ferrite spacer strip may be omitted) rather than the three employed for the cores of FIGURE 6. However, in the memory of FIGURE 3 some of the diodes are connected at their cathodes to the core winding and some are connected at their anodes to the core winding. This requires that some of the diodes be P–N diodes and others of the diodes be N–P diodes if it is desired to form all diodes on semiconductor wafers in the manner discussed in detail above.

What is claimed is:

1. A memory system comprising an array of storage means arranged in columns and rows, each said means including a magnetic element, a single winding associated with the magnetic element for controlling the state of the magnetic element, and a pair of diodes connected in opposite polarities to said winding, one diode for passing current through said winding in one direction and the other diode for passing current through said winding in the opposite direction; and a plurality of switching matrices connected to said array of storage means for selecting a magnetic element, cutting off one of the diodes associated with that element, and passing current through the other diode associated with that element.

2. The combination in a memory system of a plurality of storage means arranged in columns and rows, each said means including a magnetic element, winding means passing through the element for controlling the magnetic state of the element, and a pair of diodes oppositely connected to the winding means, the first diode of said pair for applying current through the element in one direction and the second diode of said pair for applying current through the element in the opposite direction; three switching matrices connected to said elements, the first and second matrices for applying a current through a first of a pair of diodes to a selected element, and the first and third matrices for applying a current through a second of a pair of diodes to a selected element; and means for sensing the state of a magnetic element comprising means for sensing the back voltage which develops across that element when switched from one state to the other.

3. The combination in a memory system of:

(a) a plurality of storage means arranged in columns and rows, each said means including a magnetic element, winding means passing through the element for controlling the magnetic state of the element, and a pair of diodes oppositely connected to the winding means, the first diode of said pair for applying current through the element in one direction and the second diode of said pair for applying current through the element in the opposite direction;

(b) switching matrices connected to said elements, two for applying a current through a first of a pair of diodes to a selected element, and two for applying a current through a second of a pair of diodes to a selected element; and (c) a plurality of sensing means, one for each column of the memory, each said sensing means comprising a normally cut-off diode coupled to all elements in a column in a sense to be driven into conduction when one of said elements in said column switches from a given state of saturation to the opposite state of saturation.

4. In a memory, a magnetic element; solely a single winding passing through said element; two diodes oppositely connected to said winding, the first for passing current through said winding in one direction and the other for passing current through said winding in the opposite direction; and a sensing arrangement including a normally cut-off diode connected to said first diode, like-electrode to like-electrode, for being rendered conductive by the back voltage developed across said winding when said element switches from a given state of saturation to the other state of saturation in response to a flow of current through said first diode and winding.

5. In a memory, a magnetic element; solely a single winding passing through the element; means connected to said winding for applying a drive current thereto in either direction desired for switching said element to either state of saturation desired; a sense amplifier; and a normally cut-off diode coupling said winding to said sense amplifier and poled to be driven into conduction by the back voltage developed across said winding, when the current passing through said winding switches said element from a given state of saturation to the opposite state of saturation.

6. A memory construction comprising, in combination, three generally parallel structures arranged one over the other, the center structure comprising an array of memory elements arranged in columns and rows and including windings for said elements which extend toward the two outer structures, and the two outer structures each comprising a semiconductor wafer formed with an array of diodes, one diode per memory element, arranged also in columns and rows, and engaged with respective windings of the memory elements.

7. A memory construction comprising, in combination, three generally parallel structures arranged one over the other, the center structure comprising an array of memory elements arranged in columns and rows, said array comprising doctor bladed strips of ferrite laminated together with the windings in place and then fired to form an integral structure, and the two outer structures each comprising corresponding arrays of diodes, one diode per memory element, arranged also in columns and rows, and engaged with respective windings of the memory elements.

8. A memory construction comprising, in combination, three generally parallel structures arranged one over the other, the center structure comprising an array of memory elements arranged in columns and rows, and the two outer structures each comprising a corresponding array of coupling diodes, one diode per memory element, arranged also in columns and rows, and engaged with respective windings of the memory elements, said outer structures also including arrays of diodes interconnected to provide switching matrices, said matrices being coupled to said memory elements through said coupling diodes.

9. A memory construction comprising, in combination, an integral ferrite structure with conductors extending through opposite surfaces of said structure, said structure forming an array of memory elements arranged in columns and rows, and said conductors comprising the windings for said memory elements; and two planar structures engaging the ferrite structure, one on each side of the ferrite structure, each said planar structure including an array of diodes extending from one surface thereof toward the ferrite structure positioned to engage said conductors.

10. A memory construction comprising, in combination, an integral ferrite structure with conductors extending through opposite surfaces of said structure, said structure forming an array of memory elements arranged in columns and rows, and said conductors comprising the windings for said memory elements; and two planar structures engaging the ferrite structure, one on each side of the ferrite structure, each said planar structure comprising a semiconductor wafer with an array of diodes extending from one surface of the wafer toward the ferrite structure engaged with said windings, and each wafer including also conductors on a surface of the wafer coupled to the electrodes of the diodes opposite the ones engaging the windings.

11. A memory construction comprising, in combination, an integral ferrite structure with conductors extending through opposite surfaces of said structure, said structure forming an array of memory elements arranged in columns and rows, and said conductors comprising the windings for said memory elements; and two planar structures engaging the ferrite structure, one on each side of the ferrite structure, each said planar structure including an array of diodes extending from one surface thereof toward the ferrite structure engaged with said conductors, and each planar structure including also at least one group of diodes interconnected to form a switching matrix and coupled through the array of diodes on that wafer to the memory elements.

References Cited by the Examiner

UNITED STATES PATENTS

| | | | |
|---|---|---|---|
| 2,931,015 | 3/1960 | Bonn et al. | 340—174 |
| 2,931,017 | 3/1960 | Bonn et al. | 340—174 |
| 2,931,022 | 3/1960 | Triest | 340—324 |
| 3,041,582 | 6/1962 | Cray | 340—174 X |
| 3,054,092 | 9/1962 | Breitling | 307—88 X |
| 3,110,017 | 11/1963 | Thornton | 340—174 |
| 3,145,159 | 8/1964 | Berg | 340—174 |

IRVING L. SRAGOW, *Primary Examiner.*